United States Patent
Otani

(10) Patent No.: US 11,047,793 B2
(45) Date of Patent: Jun. 29, 2021

(54) SIGNAL PROCESSING APPARATUS, SIGNAL PROCESSING METHOD, AND PROGRESS

(71) Applicant: Sony Corporation, Tokyo (JP)

(72) Inventor: Takahide Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 16/316,569

(22) PCT Filed: Aug. 3, 2017

(86) PCT No.: PCT/JP2017/028289
§ 371 (c)(1),
(2) Date: Jan. 9, 2019

(87) PCT Pub. No.: WO2018/034166
PCT Pub. Date: Feb. 22, 2018

(65) Prior Publication Data
US 2019/0310184 A1    Oct. 10, 2019

(30) Foreign Application Priority Data

Aug. 17, 2016 (JP) .............................. JP2016-159862

(51) Int. Cl.
*G06K 9/00* (2006.01)
*G01N 21/27* (2006.01)
(Continued)

(52) U.S. Cl.
CPC ............. *G01N 21/27* (2013.01); *G01N 21/31* (2013.01); *G01N 21/35* (2013.01); *G01N 21/84* (2013.01);
(Continued)

(58) Field of Classification Search
CPC ... G01N 2021/1797; G01N 2021/1765; G01N 2021/8466; G01N 21/27; G01N 21/31;
(Continued)

(56) References Cited

U.S. PATENT DOCUMENTS 7,188,450 B2 * 3/2007 Raun ..................... A01C 21/007
702/5
7,580,549 B2 * 8/2009 Wei ....................... A01B 69/001
382/104
(Continued)

FOREIGN PATENT DOCUMENTS

JP    2000350517 A    12/2000
JP    2001045867 A    2/2001
(Continued)

OTHER PUBLICATIONS

White et al. ("A new approach to monitoring spatial distribution and dynamics of wetlands and associated flows of Australian Great Artesian Basin springs using QuickBird satellite imagery", Elsevier, Journal of Hydrology 408 (2011), pp. 140-152) (Year: 2011).*
(Continued)

*Primary Examiner* — Duy M Dang
(74) *Attorney, Agent, or Firm* — Michael Best & Friedrich LLP

(57) ABSTRACT

A signal processing apparatus, method, and program that enable growth conditions of vegetation to be easily confirmed are disclosed. An NDVI relative value calculation provides a relative value to an average of a vegetation index indicative of growth conditions of grass, on the basis of a sensing image. An image indicative of the growth conditions of an inspection object can be displayed on the basis of the relative value. Further, an NDVI average calculation section calculates an NDVI average obtained by averaging normalized difference vegetation indexes NDVI indicative of the growth conditions of the grass in the entire grass, and a correlation coefficient calculation section calculates a correlation coefficient that matches the NDVI average with a predetermined NDVI specified value. The NDVI relative value calculation applies the correlation coefficient in pro-
(Continued)

viding the relative value in each measurement unit in which a measurement is performed on the grass.

22 Claims, 7 Drawing Sheets

(51) Int. Cl.
 G01N 21/35 (2014.01)
 G01N 21/84 (2006.01)
 G01N 21/31 (2006.01)
 A01G 7/00 (2006.01)
 G01N 21/17 (2006.01)

(52) U.S. Cl.
 CPC ........ A01G 7/00 (2013.01); G01N 2021/1797 (2013.01); G01N 2021/8466 (2013.01)

(58) Field of Classification Search
 CPC .... G01N 21/35; G01N 21/84; G01N 21/8986; G01N 2223/618; G01N 2223/619; G01N 2223/621; G01N 33/02; G01N 33/46; G01N 33/0098; G06K 9/00; G06K 2209/17; G06T 2207/30128; A01G 7/00
 See application file for complete search history.

(56) References Cited

U.S. PATENT DOCUMENTS 9,984,455 B1 * 5/2018 Fox ...................... H04N 5/2628
2016/0202679 A1 7/2016 Bermudez Rodrigues et al.

FOREIGN PATENT DOCUMENTS

| JP | 2008161157 A | 7/2008 |
| JP | 2011133451 A | 7/2011 |
| JP | 2012183021 A | 9/2012 |
| JP | 2013231645 A | 11/2013 |
| JP | 2014-183788 A | 10/2014 |
| WO | 2003069315 A1 | 8/2003 |
| WO | 2009116613 A1 | 9/2009 |
| WO | 2016111376 A1 | 7/2016 |

OTHER PUBLICATIONS

Extended European Search Report dated Jul. 12, 2019 for corresponding European Application No. 17841392.8.
A. B. White, et al., "A data mining approach for understanding topographic control on climate-induced inter-annual vegetation variability over the United States" Elsevier, Remote Sensing of Environment 98 (2005) pp. 1-20.
Japanese Office Action dated Dec. 22, 2020 for corresponding Japanese Application No. 2018-534340.

* cited by examiner

| B | G | B | G |
|---|---|---|---|
| IR | R | IR | R |
| B | G | B | G |
| IR | R | IR | R |

B

| B | G | B | G |
|---|---|---|---|
| G | R | G | R |
| B | G | IR | G |
| G | R | G | R |

NORMAL NDVI IMAGE

RELATIVE NDVI IMAGE

A

B

SIGNAL PROCESSING APPARATUS, SIGNAL PROCESSING METHOD, AND PROGRESS

TECHNICAL FIELD

The present disclosure relates to a signal processing apparatus, a signal processing method, and a program. Particularly, the present disclosure relates to a signal processing apparatus, a signal processing method, and a program in which growth conditions of vegetation can be easily confirmed.

BACKGROUND ART

In the past, a normalized difference vegetation index (NDVI) has been used an index indicative of a distribution condition or degree of activity of plants.

In PTL 1, for example, an information processing system that calculates a growth index of crops has been disclosed on the basis of an NDVI image obtained from an RGB image and near-infrared ray image in which crops are captured.

CITATION LIST

Patent Literature

[PTL 1]
JP 2014-183788A

SUMMARY

Technical Problem

However, for example, in a case where an environmental condition is changed when performing an inspection of vegetation, an NDVI fluctuates. Therefore, in some cases, it is difficult to confirm growth conditions of vegetation in a conventional NDVI image.

The present disclosure has been made in a consideration of such a circumstance and is aimed at enabling the growth conditions of vegetation to be easily confirmed.

Solution to Problem

A signal processing apparatus according to one aspect of the present disclosure includes a relative value calculation section configured to calculate a relative value to an average of an index from the index indicative of a state of an inspection object, which is calculated on the basis of a sensing signal; and a display processing section configured to perform processing to allow an image indicative of the state of the inspection object on the basis of the relative value to be displayed.

A signal processing method or a program according to another aspect of the present disclosure includes the steps of: calculating a relative value to an average of a vegetation index from the vegetation index indicative of a state of an inspection object, which is calculated on the basis of a sensing signal; and performing processing to allow an image indicative of the state of the inspection object on the basis of the relative value to be displayed.

According to another aspect of the present disclosure, there is calculated a relative value to an average of a vegetation index from a state indicative of growth conditions of an inspection object, which is calculated on the basis of a sensing signal; and there is performed processing to allow an image indicative of the state of the inspection object on the basis of the relative value to be displayed.

Advantageous Effect of Invention

According to an aspect of the present disclosure, growth conditions of vegetation can be easily confirmed.

BRIEF DESCRIPTION OF DRAWINGS

FIG. 2 is a diagram illustrating an arrangement example of an IR (near-infrared) pixel.

DESCRIPTION OF EMBODIMENT

Hereinafter, a specific embodiment to which the present technology is applied will be described in detail with reference to the drawings.

<Embodiment of Vegetation Inspection Apparatus>

Figure 1:
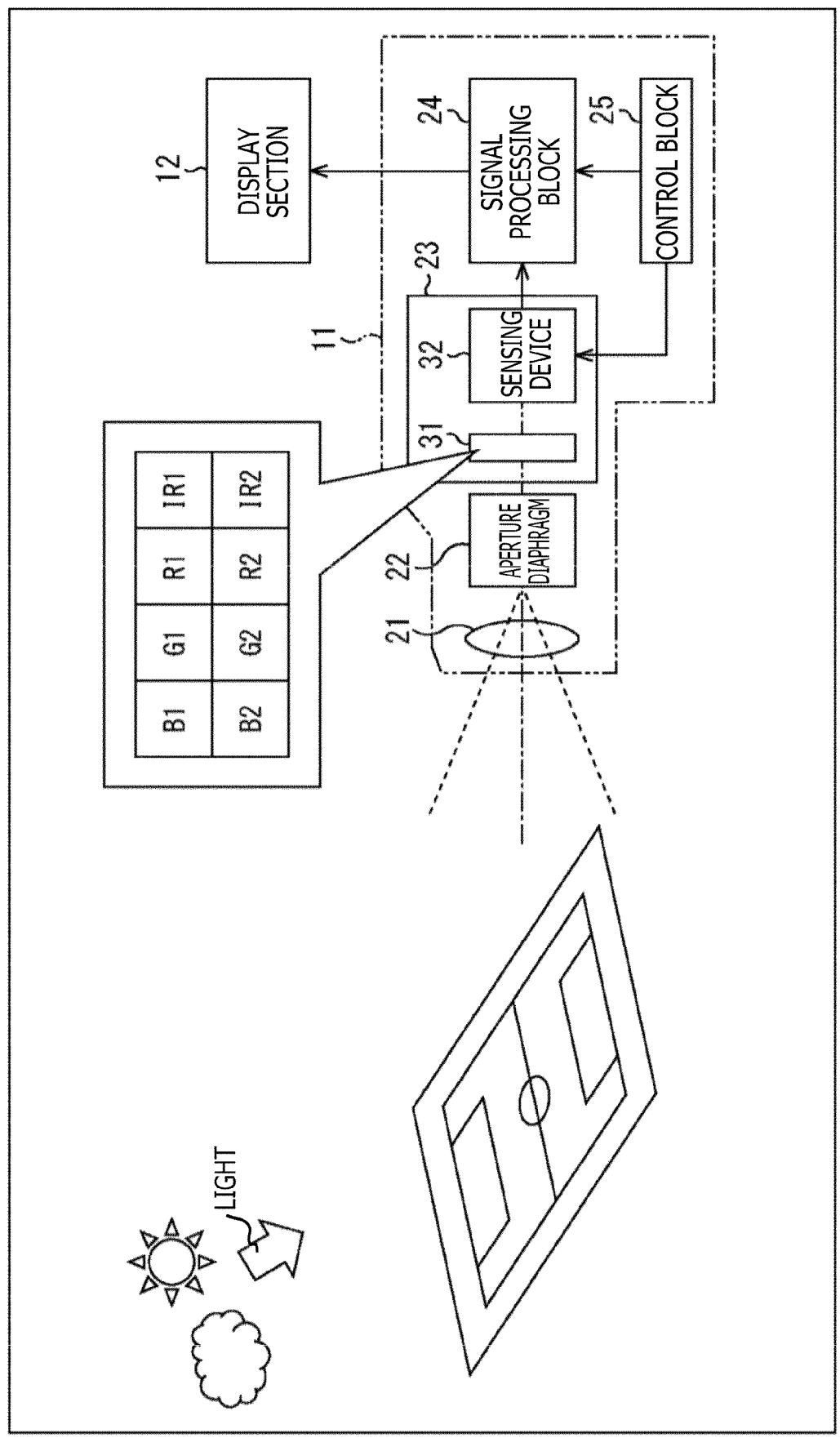
FIG. 1 is a block diagram illustrating a configuration example of an embodiment of a vegetation inspection apparatus to which the present technology is applied.

FIG. 1 is a block diagram illustrating a configuration example of an embodiment of a vegetation inspection apparatus to which the present technology is applied.

As illustrated in FIG. 1, a vegetation inspection apparatus 11 performs an inspection of grass as an inspection object in a state in which environmental light such as sunlight is radiated. Then, the vegetation inspection apparatus 11 displays an image (e.g., a relative NDVI image described below) indicative of growth conditions such as a grass state or a degree of activity on a display section 12.

For example, the vegetation inspection apparatus 11 includes an optical system 21, an aperture diaphragm 22, a spectral sensor 23, a signal processing block 24, and a control block 25. Further, the spectral sensor 23 has a spectroscope 31 and a sensing device 32.

The optical system 21 has one or plural pieces of lenses. For example, the optical system 21 collects light incident to the vegetation inspection apparatus 11, such as reflected light in which the environmental light is reflected on the grass. Further, the optical system 21 provides an image of a photographic subject on a detector plane of the sensing device 32 of the spectral sensor 23.

The aperture diaphragm 22 controls amount of light collected into the spectral sensor 23 via the optical system 21. Thereby, the aperture diaphragm 22 adjusts an exposure of an image acquired by the spectral sensor 23.

The spectral sensor 23 detects components in plural different wavelength regions of the reflected light in which the environmental light is reflected on the grass. Specifically, the spectral sensor 23 separates the reflected light into light in plural wavelength regions by using the spectroscope 31. Further, the spectral sensor 23 provides a detection signal in which brightness of light (spectrally split component) of respective wavelength regions is detected in each pixel of the sensing device 32 for the signal processing block 24.

The spectroscope 31 has a configuration in which a plurality of optical filters that transmit light of predetermined wavelength regions are arranged in each pixel of the sensing device 32. Then, spectroscope 31 separates light radiated on the detector plane of the sensing device 32 by using respective optical filters. Note that the above optical filter is referred to as a color filter that separates visible light into each color.

In FIG. 1, an example of the optical filter that is arranged as the spectroscope 31 is illustrated. For example, eight pixels such that the number of vertical pixels×the number of horizontal pixels is 2×4 is defined as a measurement unit. Further, eight kinds of optical filters that transmit light in respective different wavelength regions are arranged in a manner corresponding to each pixel that configures the measurement unit. Specifically, in the order corresponding to a short wavelength in a manner corresponding to eight pixels of the measurement unit, an optical filter B1 that transmits first blue light, an optical filter B2 that transmits second blue light, an optical filter G1 that transmits first green light, an optical filter G2 that transmits second green light, an optical filter R1 that transmits first red light, an optical filter R2 that transmits second red light, an optical filter IR1 that transmits first infrared light, and an optical filter IR2 that transmits second infrared light are arranged.

While using as one measurement unit the above optical filter of eight pixels, the spectroscope 31 has a configuration in which the optical filter for n measurement units (n is a natural number equal to or greater than 1) is continuously arranged in the entire plane of the detector plane of the sensing device 32. Note that the measurement unit of the optical filter is not limited to a configuration in which eight pixels are defined as one measurement unit. In the measurement unit of the optical filter, other modes such as a configuration in which four pixels (R, G, B, IR) are defined as one measurement unit can be adopted.

For example, in a configuration that is a so-called Bayer arrangement and in which an R pixel, a G pixel, and a B pixel are arranged, the optical filter of an arrangement example in which a portion of pixels are replaced with IR pixels may be used. Specifically, in the G pixel in which the number of pixels is plentiful in the Bayer arrangement, as illustrated in FIG. 2A, the optical filter in which the G pixels arranged in a row of the R pixels are replaced with the IR pixels can be used. Further, the optical filter in which the B pixel in which visibility is low is replaced with the IR pixel can be used. In this case, as illustrated in FIG. 2B, a configuration in which all the B pixels are not replaced with the IR pixels but a portion of B pixels are replaced with the IR pixels can be used.

The sensing device 32 is, for example, an image pickup device having a configuration in which a plurality of pixels are arranged in a matrix pattern in the detector plane. Further, the sensing device 32 detects brightness of the spectrally split component spectrally split by each optical filter of the spectroscope 31 in each pixel. Further, the sensing device 32 outputs the detection signal (sensing signal) in accordance with the brightness of each spectrally split component.

Note that, in addition to an area sensor that gets an object by a plane, as the sensing device 32, a line sensor that gets the object by a line can be used. Further, even in the case where the R pixel and the IR pixel are arranged only one by one in the sensing device 32, a mechanism for moving a sensor or a measurement object is provided to thereby scan the object.

The signal processing block 24 performs signal processing on the detection signal (that is, a sensing image sensed by the sensing device 32) output from the spectral sensor 23. Thereby, the signal processing block 24 generates an image indicative of a result in which the growth conditions of the grass are inspected and displays the image on the display section 12. Note that a detailed configuration of the signal processing block 24 will be described below with reference to FIG. 3.

The control block 25 performs control for each block that configures the vegetation inspection apparatus 11 such as the sensing device 32 and the signal processing block 24 so that the growth conditions of the grass can be preferably inspected in the vegetation inspection apparatus 11.

The vegetation inspection apparatus 11 configured as described above can inspect the growth conditions of the grass by using a normalized difference vegetation index NDVI that is numerically indicative of the growth conditions. Further, the vegetation inspection apparatus 11 can acquire an NDVI image constructed by the normalized difference vegetation index NDVI as a result in which the growth conditions of the grass are inspected. The normalized difference vegetation index NDVI is obtained by calculating the following formula (1) by using a pixel value R of a pixel in which red light is detected in the sensing device 32 and a pixel value IR of a pixel in which near-infrared light is detected.

[Math. 1]

$$NDVI = \frac{IR - R}{IR + R} \quad (1)$$

Here, the normalized difference vegetation index NDVI is used as an index of growth of stems and leaves. Note that a reflectance (pixel value IR) of the near-infrared light and a reflectance (pixel value R) of the red light are calculated by obtaining as an incident light intensity a red light intensity and near-infrared ray intensity in an area such as sky and by obtaining as a reflected light intensity the red light intensity and near-infrared ray intensity in an object area in an RGB image and a near-infrared ray image in an area that is not the object area. Further, in the reflectance of the near-infrared light and that of the red light, the incident light intensity may be measured by using a diffusion plate having a known reflectance as a reference. Further, a reflection coefficient may be calculated on the basis of a ratio between the incident light intensity and reflection luminance of an object and then the reflectance of the near-infrared light and that of the red light may be obtained by converting the reflection coefficient into a reflectance. Further, the vegetation inspection apparatus 11 calculates the NDVI image by using an average, dispersion, high-order dispersion, or the like of NDVI only in the object area. Through the process, the NDVI image is calculated from only information obtained from pixels in the object area. Thereby, the NDVI image can be calculated with higher accuracy.

Incidentally, the vegetation inspection apparatus 11 performs an inspection of the grass in an outdoor environment. Thereby, for example, the detection signal detected by the spectral sensor 23 may fluctuate, for example, in accordance with a change in environmental conditions such as a position of sun, weather (fine/cloudy), or a direction of grass grain. In the result, the NDVI image is generated by using the detection signal output from the spectral sensor 23 directly. In such a case, it is assumed that, in some cases, it is difficult to determine the growth conditions of the grass by an influence in which the fluctuation of the detection signal is given to the NDVI image.

To solve the above problem, in the vegetation inspection apparatus 11, the signal processing is performed on the detection signal by the signal processing block 24 so that the influence given to the NDVI image is suppressed by the fluctuation in the detection signal due to the change in the environmental conditions. The process permits the growth conditions of vegetation to be easily confirmed. For example, it is possible to easily make a distinction between a location in which the grass is preferably grown or a location in which the grass is not preferably grown.

Figure 3:
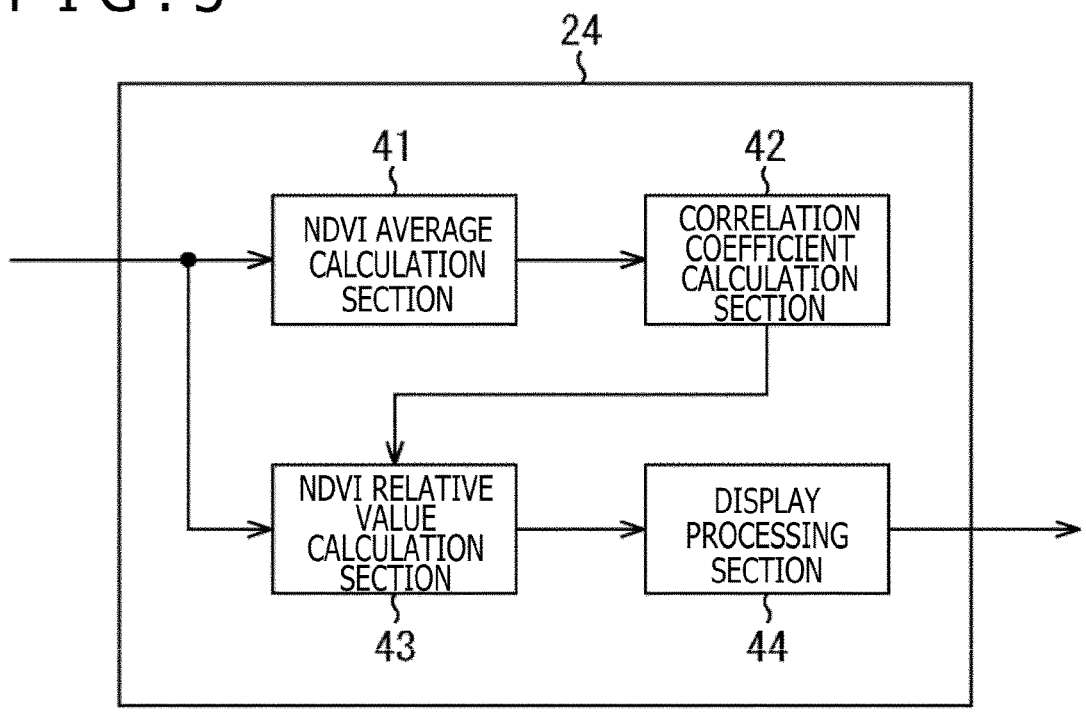
FIG. 3 is a block diagram illustrating a configuration example of a signal processing block.

FIG. 3 is a block diagram illustrating a configuration example of the signal processing block 24.

As illustrated in FIG. 3, the signal processing block 24 includes an NDVI average calculation section 41, a correlation coefficient calculation section 42, an NDVI relative value calculation section 43, and a display processing section 44.

By using the detection signal acquired by actually sensing the grass by the sensing device 32 illustrated in FIG. 1, the NDVI average calculation section 41 calculates an NDVI average Na obtained by averaging the normalized difference vegetation index NDVI of the entire grass and provides the NDVI average Na for the correlation coefficient calculation section 42.

For example, the NDVI average calculation section 41 calculates an average Ra of all the pixel values R of the red light detected in a grass area in the pixel value R of the red light included in the detection signal output from the spectral sensor 23. Similarly, the NDVI average calculation section 41 calculates an average IRa of all the pixel values IR of the near-infrared light detected in the grass area in the pixel value IR of the near-infrared light included in the detection signal output from the spectral sensor 23. Further, the NDVI average calculation section 41 can obtain the NDVI average Na to the entire grass from the average Ra of the red light and the average IRa of the near-infrared light on the basis of the following formula (2).

[Math. 2]

$$Na = \frac{IRa - Ra}{IRa + Ra} \quad (2)$$

The correlation coefficient calculation section 42 calculates a correlation coefficient α by which the NDVI average Na obtained by the NDVI average calculation section 41 is matched with a predetermined NDVI specified value Nd and provides the correlation coefficient α for the NDVI relative value calculation section 43. Here, it is assumed that in the vegetation inspection apparatus 11, an average of the normalized difference vegetation indexes NDVI to the entire grass is the NDVI specified value Nd determined to be previously a specified value. Further, as represented in the following formula (3), the NDVI specified value Nd is represented by using the average Ra of the red light, the average IRa of the near-infrared light, and the correlation coefficient α.

[Math. 3]

$$Nd = \frac{IRa - \alpha Ra}{IRa + \alpha Ra} \quad (3)$$

Further, from formula (3), the correlation coefficient α that allows the average of the normalized difference vegetation indexes NDVI that is originally the NDVI average Na to be matched with the NDVI specified value Nd is represented by the following formula (4).

[Math. 4]

$$\alpha = \frac{IRa(1 - Nd)}{Ra(1 + Nd)} \quad (4)$$

In each measurement unit of the detection signal acquired by actually sensing the grass by the sensing device 32 illustrated in FIG. 1 (for example, on the basis of the sensing signal for each pixel and not the entire NDVI image), the NDVI relative value calculation section 43 applies the correlation coefficient α calculated by the correlation coefficient calculation section 42 and calculates an NDVI relative value Nr relative to the NDVI average Na. Note that the NDVI average Na is used in order to describe the correlation coefficient α and is not required for an operation to obtain the NDVI relative value Nr. Specifically, as represented in the following formula (5), the NDVI relative value calculation section 43 can obtain the NDVI relative value Nr (x, y) on the basis of the pixel value R (x, y) of the red light and pixel value IR (x, y) of the infrared light for each measurement unit (x, y) of the sensing device 32.

[Math. 5]

$$Nr(x, y) = \frac{IR(x, y) - \alpha R(x, y)}{IR(x, y) + \alpha R(x, y)} \quad (5)$$

The display processing section 44 generates the NDVI image based on the NDVI relative value Nr calculated by the NDVI relative value calculation section 43 and performs display processing in which the NDVI image is displayed on the display section 12. For example, the display processing section 44 maps a color set in accordance with the NDVI relative value Nr (x, y) in each measurement unit (x, y) like a heat map to thereby generate the NDVI image. Note that, as described above, the NDVI relative value Nr (x, y) is relative to the NDVI average Na. Hereinafter, the NDVI image generated from the NDVI relative value Nr (x, y) is appropriately referred to as the relative NDVI image.

As described above, the vegetation inspection apparatus 11 is configured and the relative NDVI image indicative of a result in which the growth conditions of the grass are inspected is displayed on the display section 12.

Further, in the vegetation inspection apparatus 11, for example, the NDVI specified value Nd can be set (for example, set to 0.5 to 0.7 when the inspection object is the grass) in a portion in which a change in the normalized difference vegetation index NDVI is large. Thereby, the NDVI relative value Nr is calculated by using the NDVI specified value Nd as a reference. Therefore, the relative NDVI image in which it is easy to confirm a portion in which a change in the normalized difference vegetation index NDVI is large, that is, a portion in which a change in the growth conditions of the grass is large can be generated. The above relative NDVI image is generated, and thereby it is possible for the vegetation inspection apparatus 11 to confirm the growth condition of the grass more easily than a conventional NDVI image in which the normalized difference vegetation index NDVI is directly used.

Further, the vegetation inspection apparatus 11 can realize quantization and visualization by using the NDVI relative value Nr for the growth conditions of the grass in a level that is incapable of being visually confirmed in the conventional NDVI image. That is, the vegetation inspection apparatus 11 matches the NDVI average Na with the NDVI specified value Nd (to be always constant), and thereby subjects the detection signal output from the sensing device 32 to a signal normalization. Thereby, the vegetation inspection apparatus 11 can suppress an influence that is given to the detection signal due to a change in the environmental conditions and generate the relative NDVI image in which it is easy to confirm the growth conditions of the grass.

<Regarding Signal Processing>

Figure 4:
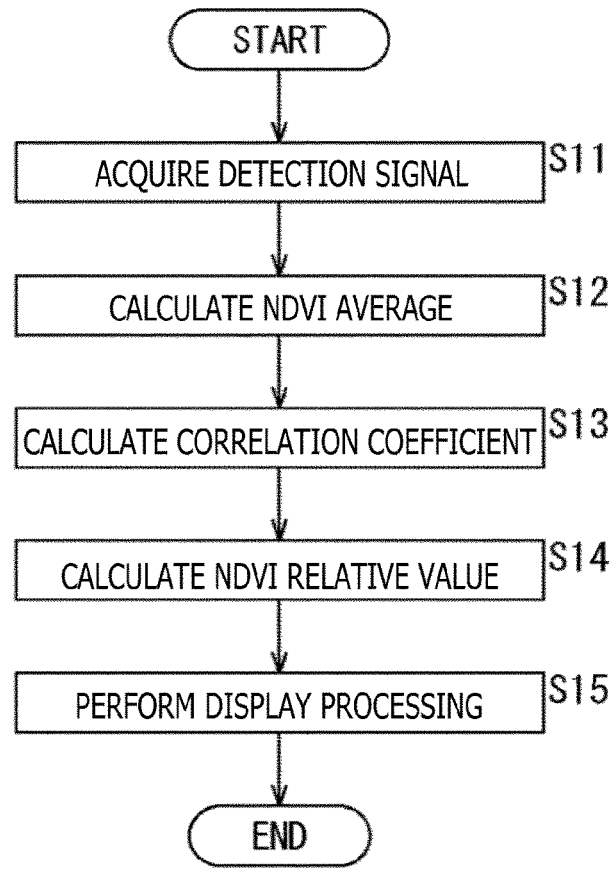
FIG. 4 is a flowchart describing signal processing performed in the signal processing block.

Next, the signal processing that is performed in the signal processing block 24 will be described with reference to a flowchart illustrated in FIG. 4.

In step S11, for example, the detection signal for a piece of relative NDVI image is provided from the sensing device 32 to the signal processing block 24. Then, the NDVI average calculation section 41 acquires the detection signal. In step S12, the NDVI average calculation section 41 obtains the average Ra of the red light and the average IRa of the near-infrared light from the detection signal provided from the sensing device 32. Further, the NDVI average calculation section 41 calculates the NDVI average Na on the basis of formula (2) described above.

In step S13, the correlation coefficient calculation section 42 calculates the correlation coefficient α that matches the NDVI average Na obtained by the NDVI average calculation section 41 in step S11 with the NDVI specified value Nd on the basis of formula (4) described above.

In step S14, the NDVI relative value calculation section 43 applies the correlation coefficient α obtained by the correlation coefficient calculation section 42 in step S12 and calculates the NDVI relative value Nr on the basis of formula (5) described above in each measurement unit of the detection signal provided from the sensing device 32.

In step S15, the display processing section 44 generates the relative NDVI image on the basis of the NDVI relative value Nr obtained in each measurement unit by the NDVI relative value calculation section 43 in step S13 and performs display processing in which the relative NDVI image is displayed on the display section 12.

After the process of step S15, the signal processing in the signal processing block 24 is completed.

As described above, the signal processing block 24 can suppress an influence that is given to the detection signal due to a change in the environmental conditions and generate the relative NDVI image in which the growth conditions of the grass are confirmed more easily than the conventional NDVI image.

Figure 5:
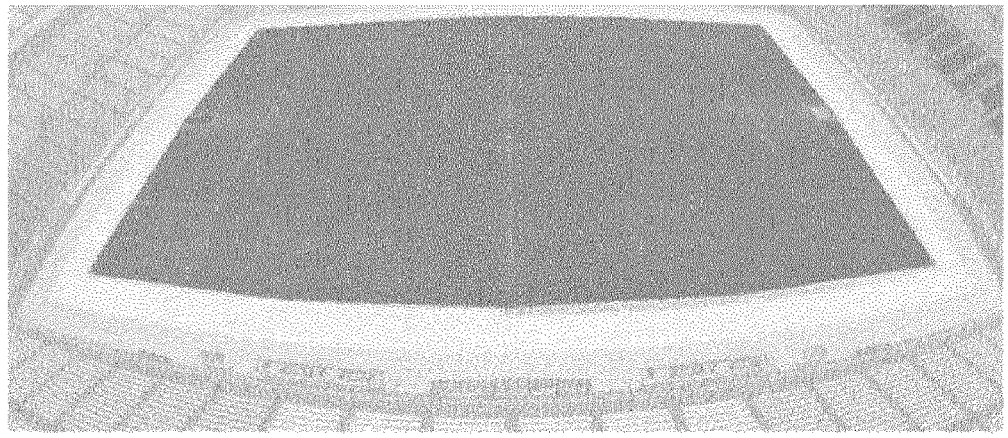
FIG. 5 is a diagram illustrating an example of a conventional NDVI image and that of a relative NDVI image.
Figure 5:
Figure 5:
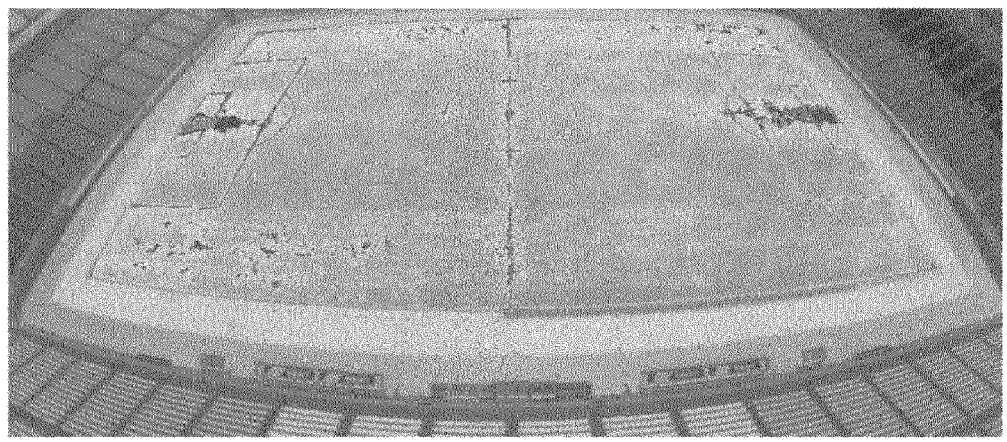

In FIG. 5, for example, an example of the conventional NDVI image and an example of the relative NDVI image are illustrated.

On the upper side of FIG. 5, the conventional NDVI image is illustrated, and on the lower side of FIG. 5, the relative NDVI image is illustrated. Both the conventional NDVI image and the relative NDVI image illustrated in FIG. 5 are generated by using the same detection signal.

For example, the vegetation inspection apparatus 11 may display only the relative NDVI image on the display section 12. Alternatively, the vegetation inspection apparatus 11 may simultaneously display the conventional NDVI image and the relative NDVI image on the display section 12 while disposed to thereby compare them. Further, the vegetation inspection apparatus 11 may switch a display between the conventional NDVI image and the relative NDVI image through the user operation. Further, the conventional NDVI image and the relative NDVI image are not limited to a simultaneous display of them or a switching display of them. For example, the vegetation inspection apparatus 11 can display a live image photographed by a normal image pickup apparatus, other images, or the like simultaneously or while switching.

The vegetation inspection apparatus 11 calculates the normalized difference vegetation index NDVI from an image obtained through sensing. Thereby, the vegetation inspection apparatus 11 can display a distribution or degree of activity of the grass as the heat map as illustrated in the upper side of FIG. 5. As described above, the vegetation inspection apparatus 11 further obtains the NDVI relative value Nr so as to be relative to the NDVI average Na. Thereby, as illustrated in the lower side of FIG. 5, the vegetation inspection apparatus 11 can generate the relative NDVI image that emphatically indicates a portion in which the growth conditions of the grass are satisfactory and a portion in which the growth conditions of the grass are unsatisfactory. For example, the vegetation inspection apparatus 11 appropriately sets the NDVI specified value Nd to thereby generate the relative NDVI image such that the portion in which the growth conditions of the grass are unsatisfactory is noticeable.

Here, with regard to a color display of the heat map, as a highlight of the satisfactory portion and unsatisfactory portion of the growth conditions of the grass, for example, the satisfactory portion of the growth conditions of the grass can be displayed so as to have a blue color. The unsatisfactory portion of the growth conditions of the grass can be displayed so as to have a red color. Further, in accordance with a predetermined standard, the color display may be performed only on the satisfactory portion or unsatisfactory portion of the growth conditions of the grass. Note that the highlight is not limited to the color display, and further shading, luminance, or saturation of an image may be changed to thereby present the highlight. A degree of the display modes can be switched through setting or operations of the user. Particularly, the user changes the NDVI specified value Nd or multiplies the NDVI specified value Nd by the correlation coefficient α to thereby change how to highlight the unsatisfactory portion of the growth conditions of the grass.

Incidentally, in FIG. 5, the relative NDVI image is generated over the entire grass. Further, the vegetation inspection apparatus 11 may generate the relative NDVI image in each specified area of interest while paying attention to the specified area.

Figure 6:
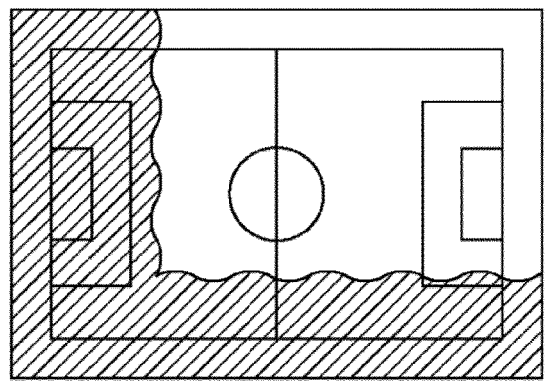
FIG. 6 is a diagram illustrating an example in which the relative NDVI image is generated in each area of interest.
Figure 6:
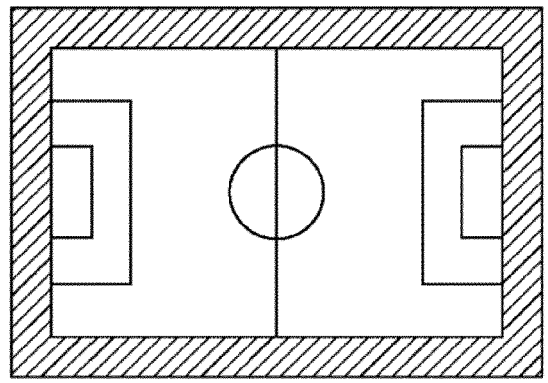

As illustrated in FIG. 6A, for example, the vegetation inspection apparatus 11 can specify a sunny area (area without hatching) in which sunlight is radiated on the grass and a shadow area (area with hatching) in which sunlight is not radiated on the grass. Further, the vegetation inspection apparatus 11 can individually generate the respective relative NDVI images of the sunny area and the shadow area.

Specifically, from the entire grass sensed by the spectral sensor 23, the vegetation inspection apparatus 11 can set the area of interest on the basis of the brightness and allow the signal processing block 24 to perform the signal processing in each area of interest. In this case, the NDVI average calculation section 41 calculates the NDVI average Na concerning the area of interest of the grass. The correlation coefficient calculation section 42 calculates the correlation coefficient α concerning the area of interest of the grass. Further, the NDVI relative value calculation section 43 can calculate the NDVI relative value Nr relative to the NDVI average Na in each area of interest of the grass.

Through the process, the vegetation inspection apparatus 11 can inspect the growth conditions of the grass more particularly in each area of interest, for example, in each of the sunny area and the shadow area. Note that specification of the area of interest is not limited to the sunny area and the shadow area. An arbitrary area can be specified, for example, a half of a tournament-quality court is specified, and the like.

Further, as illustrated in FIG. 6B, the vegetation inspection apparatus 11 can distinguish the grass area (area without hatching) and an area other than the grass (area with hatching) in the entire image. Further, the vegetation inspection apparatus 11 can specify only the grass area as the area of interest and generate the relative NDVI image of the grass area. At this time, the specification of the grass area can be performed on the basis of a normal image recognition or on the basis of the normalized difference vegetation index NDVI. As described above, the vegetation inspection apparatus 11 can automatically determine and specify the area of interest. In addition, the vegetation inspection apparatus 11 can specify an arbitrary area in the entire image as the area of interest, for example, in accordance with setting of the user.

Note that, in the present embodiment, descriptions will be made with reference to the normalized difference vegetation index NDVI. Further, in the vegetation inspection apparatus 11, the vegetation index (for example, an RVI (Ratio Vegetation Index), a GNDVI (Green NDVI), and the like) other than the normalized difference vegetation index NDVI may be used. Further, the vegetation inspection apparatus 11 can cover a forest, agricultural crops, and the like in addition to the grass as described above as an inspection object to be inspected on the growth conditions.

As other vegetation indexes, for example, the ratio vegetation index (RVI) calculated by performing an operation of the following formula (6), a difference vegetation index (DVI) calculated by performing an operation of the following formula (7), or the like can be used.

[Math. 6]

$$RVI = \frac{IR}{R} \quad (6)$$

[Math. 7]

$$DVI = IR - R \quad (7)$$

Note, however, that, in formulas (6) and (7), IR represents a reflectance (pixel value of a pixel that detects the near-infrared light) of a near-infrared area and R represents a reflectance (pixel value of a pixel that detects the red light) of red in a visible area. Note that, here, only the vegetation index in which IR and R are used as a parameter is exemplified. Further, it is as a matter of course possible to measure other vegetation indexes by using, as a parameter, reflectances, etc. of other light other than red in the visible area. In addition, a spectral ratio is not limited to a combination of R and IR.

Further, the present technology can be applied to a vegetation inspection system connected through a network, for example, in addition to an apparatus that is configured by an apparatus alone like the vegetation inspection apparatus 11.

Figure 7:
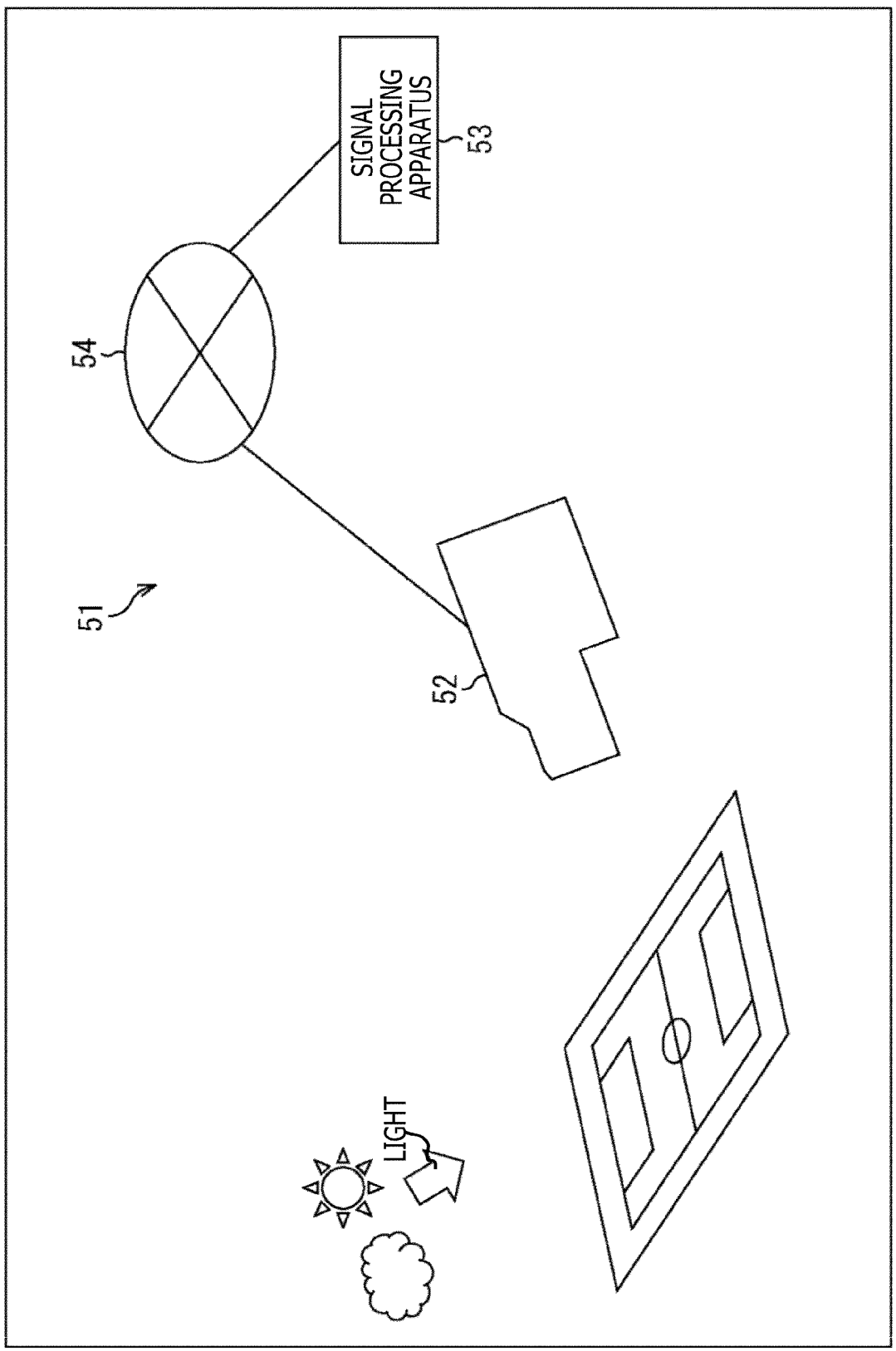
FIG. 7 is a block diagram illustrating a configuration example of a vegetation inspection system.

As illustrated in FIG. 7, for example, a vegetation inspection system 51 has a configuration in which an image pickup apparatus 52 and a signal processing apparatus 53 for vegetation inspection are connected through a network 54.

The image pickup apparatus 52 includes the spectral sensor 23 illustrated in FIG. 1. The image pickup apparatus 52 detects components in a plurality of different wavelength regions regarding reflected light in which the environmental light is reflected on the grass. Further, the image pickup apparatus 52 transmits a detection signal indicative of detection results to the signal processing apparatus 53 through the network 54.

The signal processing apparatus 53 has the function similar to that of the signal processing block 24 illustrated in FIG. 1. The signal processing apparatus 53 receives the detection signal that is transmitted through the network 54 from the image pickup apparatus 52 for vegetation inspection. Further, the signal processing apparatus 53 performs the signal processing in which the relative NDVI image as described above is generated. Then, the signal processing apparatus 53 accumulates the relative NDVI images in an accumulation apparatus (not illustrated) connected to the network 54 to thereby observe a change in the growth conditions of the grass.

As described above, according to the present technology, the grass in a remote location can be inspected through the network 54 and a manager of the grass can perform a management of the grass everywhere. Although not illustrated in the figure, a plurality of the image pickup apparatuses 52 are connected to the network 54, and thereby the manager can one-dimensionally manage the grass in a plurality of locations. Further, the manager can observe the growth conditions of the grass by using a multi-camera in which the plurality of the image pickup apparatuses 52 link up with one another. Further, the manager can observe the growth conditions of the grass while moving by using a UAV (Unmanned Aerial Vehicle) such as a so-called drone.

Note that, in the present embodiment, a vegetation index based on reflection of light by plants is described by using plants such as the grass as the inspection object. According to the present technology, an object other than plants may be used as the inspection object. The present technology can be applied to an inspection of various inspection objects by using indexes other than the vegetation index. Further, the vegetation index is an index that indicates the growth conditions of plants, and additionally, for example, can be used to make a contribution indirectly to the growth conditions and grasp plant conditions even if conditions are not directly regarded as the growth conditions like conditions of photosynthesis or the like.

Note that each processing described with reference to the flowchart described above need not always be sequentially executed in time series described in the flowchart. Thus, the processing includes the processes that are executed in parallel or discretely (parallel processes or a process based on objects, for example). Further, a program may be processed by a single CPU or by a plurality of CPUs in a distributed manner. Further, in the present specification, a system represents the entire apparatus configured by a plurality of apparatuses.

The above series of processing (signal processing method) may be executed by hardware or may be executed by software. When the series of processing is executed by software, programs constituting the software are installed to the computer from a program recording medium on which programs are recorded. In this case, the computer includes a computer embedded into dedicated hardware and a general-purpose personal computer capable of executing various kinds of functions by installing various kinds of programs.

Figure 8:
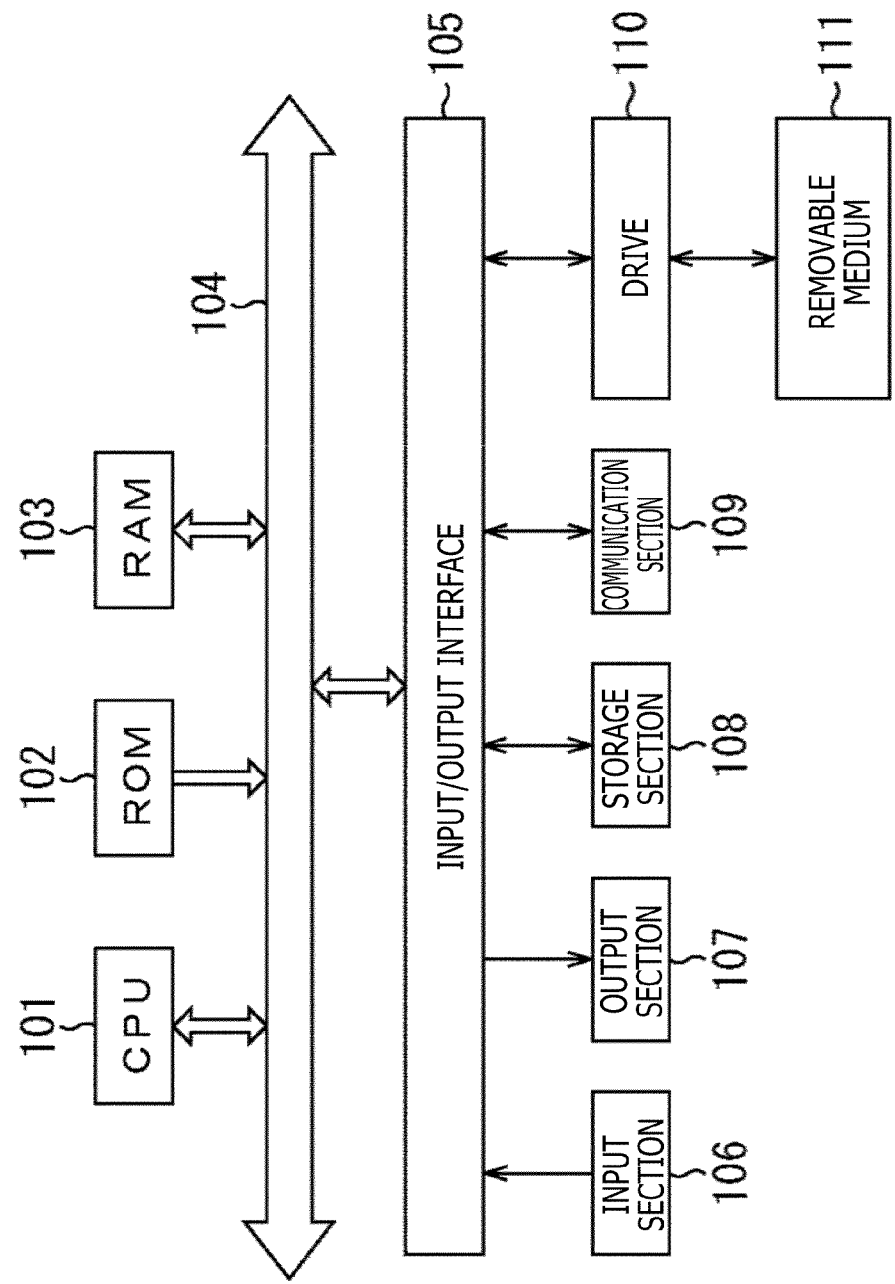
FIG. 8 is a block diagram illustrating a configuration example of the embodiment of a computer to which the present technology is applied.

FIG. 8 is a block diagram illustrating a configuration example of hardware of a computer which executes the series of processes described above under programs.

In the computer, a CPU (Central Processing Unit) 101, a ROM (Read Only Memory) 102, and a RAM (Random Access Memory) 103 are interconnected via a bus 104.

An input/output interface 105 is further connected to the bus 104. An input section 106, an output section 107, a storage section 108, a communication section 109, and a drive 110 are connected to the input/output interface 105. The input section 106 is constituted by a keyboard, a mouse, a microphone, or the like. The output section 107 is constituted by a display, a speaker, or the like. The storage section 108 is constituted by a hard disk, a non-volatile memory, or the like. The communication section 109 is constituted by a network interface or the like. The drive 110 drives a removable medium 111 such as a magnetic disk, an optical disk, a magneto optical disk, or a semiconductor memory.

In the computer configured as described above, the CPU 101 loads, on the RAM 103, a program stored in the storage section 108 through the input/output interface 105 and the bus 104 and executes the program to thereby execute the series of processes, for example.

The program executed by the computer (CPU 101) may be recorded, for example, in the removable medium 111 that is a package medium including a magnetic disk (including a flexible disk), an optical disk (CD-ROM (Compact Disc-Read Only Memory), DVD (Digital Versatile Disc), or the like), a magneto optical disk, a semiconductor memory, or the like and provided. Further, alternatively, the program may be provided via a wired or wireless transmission medium such as a local area network, the Internet, or digital satellite broadcasting.

In the computer, the program can be installed into the storage section 108 via the input/output interface 105 when the removable medium 111 is mounted on the drive 110. Also, the program may be received by the communication section 109 via a wired or wireless transmission medium and be installed into the storage section 108. In addition, the program may be installed beforehand into the ROM 102 or the storage section 108.

Note that the present technology can also take the following configuration.

(1)

A signal processing apparatus including:

a relative value calculation section configured to calculate a relative value to an average of an index from the index indicative of a state of an inspection object, which is calculated on a basis of a sensing signal; and a display processing section configured to perform processing to allow an image indicative of the state of the inspection object on a basis of the relative value to be displayed.

(2)

The signal processing apparatus according to (1) above, further including:

an average calculation section configured to calculate the average of the index, which is obtained by averaging the index in an entire inspection object; and a correlation coefficient calculation section configured to calculate a correlation coefficient that matches the average of the index calculated by the average calculation section with a predetermined specified value, in which the relative value calculation section applies the correlation coefficient and calculates the relative value of the index relative to the average of the index in each measurement unit in which a measurement is performed on the inspection object.

(3)

The signal processing apparatus according to (2) above, in which the sensing signal includes at least a detection value according to brightness of near-infrared light and red light, and the relative value calculation section divides a value obtained by subtracting a value obtained by multiplying the detection value of the red light by the correlation coefficient from the detection value of the near-infrared light by a value obtained by adding a value obtained by multiplying the detection value of the red light by the correlation coefficient to the detection value of the near-infrared light to thereby calculate the relative value.

(4)

The signal processing apparatus according to any one of (1) to (3) above, further including:

a spectral sensor configured to detect components in a plurality of different wavelength regions regarding reflected light in which environmental light is reflected by the inspection object.

(5)

The signal processing apparatus according to (4) above, in which the spectral sensor has a sensing device in which a plurality of pixels are arranged in a detector plane in a matrix pattern and a spectroscope in which a plurality of optical filters that transmit light in a predetermined wavelength region are arranged in each pixel of the sensing device.

(6)

The signal processing apparatus according to any one of (2) to (5) above, in which the display processing section generates an image indicative of the state of the inspection object and allows a display section to display the image on a basis of the relative value of the index calculated in each measurement unit by the relative value calculation section.

(7)

The signal processing apparatus according to any one of (2) to (6) above, in which the average calculation section specifies a predetermined area of the inspection object projected on a sensing image including the sensing signal as an area of interest and calculates the average of the index in the area of interest.

(8)

The signal processing apparatus according to (7) above, in which the correlation coefficient calculation section obtains the correlation coefficient regarding the area of interest, and the relative value calculation section calculates the relative value of the index in the area of interest.

(9)

The signal processing apparatus according to (7) above, in which a sunny area in which sunlight is radiated on the inspection object and a shadow area in which sunlight is not radiated on the inspection object are specified as the area of interest.

(10)

The signal processing apparatus according to (7) above, in which an area on which the inspection object in an entire sensing image is projected is specified as the area of interest.

(11)

The signal processing apparatus according to (7) above, in which an arbitrary area in the entire sensing image is specified in accordance with setting of a user as the area of interest.

(12)

The signal processing apparatus according to any one of (1) to (11) above, in which the inspection object is a plant, and the state indicates growth conditions of the plant.

(13)

The signal processing apparatus according to (12) above, in which the index is a vegetation index based on reflection of light by the plant.

(14)

The signal processing apparatus according to (13) above, in which the vegetation index is an NDVI (Normalized Difference Vegetation Index).

(15)

A signal processing method including the steps of:

calculating a relative value to an average of a vegetation index from the vegetation index indicative of a state of an inspection object, which is calculated on a basis of a sensing signal; and performing processing to allow an image indicative of the state of the inspection object on a basis of the relative value to be displayed.

(16)

A program for causing a computer to execute signal processing including the steps of:

calculating a relative value to an average of a vegetation index from the vegetation index indicative of a state of an inspection object, which is calculated on a basis of a sensing signal; and performing processing to allow an image indicative of the state of the inspection object on a basis of the relative value to be displayed.

In addition, the embodiment of the present disclosure is not limited to the above described embodiment and can be variously modified without departing from the scope of the present disclosure.

REFERENCE SIGNS LIST

11 Vegetation inspection apparatus, 12 Display section, 21 Optical system, 22 Aperture diaphragm, 23 Spectral sensor, 24 Signal processing block, 25 Control block, 31 Spectroscope, 32 Sensing device, 41 NDVI average calculation section, 42 Correlation coefficient calculation section, 43 NDVI relative value calculation section, 44 Display processing section, 51 Vegetation inspection system, 52 Image pickup apparatus, 53 Signal processing apparatus, 54 Network

The invention claimed is:

1. A signal processing apparatus comprising:

a relative value calculation section configured to calculate a relative value to an average of an index from the index indicative of a state of an inspection object, which is calculated on a basis of a sensing signal;

a display processing section configured to perform processing to allow an image indicative of the state of the inspection object on a basis of the relative value to be displayed; and an average calculation section configured to specify a predetermined area of the inspection object projected on a sensing image including the sensing signal as an area of interest and configured to calculate the average of the index in the area of interest.

2. The signal processing apparatus according to claim 1, further comprising:

a spectral sensor configured to detect components in a plurality of different wavelength regions regarding reflected light in which environmental light is reflected by the inspection object.

3. The signal processing apparatus according to claim 2, wherein the spectral sensor has a sensing device in which a plurality of pixels are arranged in a detector plane in a matrix pattern and a spectroscope in which a plurality of optical filters that transmit light in a predetermined wavelength region are arranged in each pixel of the sensing device.

4. The signal processing apparatus according to claim 1, wherein the inspection object is a plant, and the state indicates growth conditions of the plant.

5. The signal processing apparatus according to claim 4, wherein the index is a vegetation index based on reflection of light by the plant.

6. The signal processing apparatus according to claim 5, wherein the vegetation index is an NDVI (Normalized Difference Vegetation Index).

7. A signal processing apparatus comprising:

a relative value calculation section configured to calculate a relative value to an average of an index from the index indicative of a state of an inspection object, which is calculated on a basis of a sensing signal;

a display processing section configured to perform processing to allow an image indicative of the state of the inspection object on a basis of the relative value to be displayed;

an average calculation section configured to calculate the average of the index, which is obtained by averaging the index in an entire inspection object; and a correlation coefficient calculation section configured to calculate a correlation coefficient that matches the average of the index calculated by the average calculation section with a predetermined specified value, wherein the relative value calculation section is configured to apply the correlation coefficient and is configured to calculates the relative value of the index relative to the average of the index in each measurement unit in which a measurement is performed on the inspection object.

8. The signal processing apparatus according to claim 7, wherein the sensing signal includes at least a detection value according to brightness of near-infrared light and red light, and the relative value calculation section is configured to divide a value obtained by subtracting a value obtained by multiplying the detection value of the red light by the correlation coefficient from the detection value of the near-infrared light by a value obtained by adding a value obtained by multiplying the detection value of the red light by the correlation coefficient to the detection value of the near-infrared light to thereby calculate the relative value.

9. The signal processing apparatus according to claim 7, wherein
the display processing section is configured to generate an image indicative of the state of the inspection object and allows a display section to display the image on a basis of the relative value of the index calculated in each measurement unit by the relative value calculation section.

10. The signal processing apparatus according to claim 7, wherein
the correlation coefficient calculation section is configured to obtain the correlation coefficient regarding the area of interest, and
the relative value calculation section is configured to calculate the relative value of the index in the area of interest.

11. The signal processing apparatus according to claim 7, wherein a sunny area in which sunlight is radiated on the inspection object and a shadow area in which sunlight is not radiated on the inspection object are specified as the area of interest.

12. The signal processing apparatus according to claim 7, wherein an area on which the inspection object in an entire sensing image is projected is specified as the area of interest.

13. The signal processing apparatus according to claim 7, wherein an arbitrary area in the entire sensing image is specified in accordance with setting of a user as the area of interest.

14. A signal processing method comprising:
calculating a relative value to an average of an index from the index indicative of a state of an inspection object, which is calculated on a basis of a sensing signal;
performing processing to allow an image indicative of the state of the inspection object on a basis of the relative value to be displayed; and
specifying a predetermined area of the inspection object projected on a sensing image including the sensing signal as an area of interest and calculating the average of the index in the area of interest.

15. The signal processing method according to claim 14, wherein the inspection object is a plant, the state indicates growth conditions of the plant, and the index is a index based on reflection of light by the plant.

16. The signal processing method according to claim 14, further comprising:
calculating the average of the index by averaging the index in an entire inspection object;
calculating a correlation coefficient that matches the average of the index with a predetermined specified value; and
applying the correlation coefficient and calculating the relative value of the index relative to the average of the index in each measurement unit in which a measurement is performed on the inspection object.

17. A non-transitory computer readable medium storing a program for signal processing, the program being executable by a computer to perform operations comprising:
calculating a relative value to an average of an index from the index indicative of a state of an inspection object, which is calculated on a basis of a sensing signal;
performing processing to allow an image indicative of the state of the inspection object on a basis of the relative value to be displayed;
specifying a predetermined area of the inspection object projected on a sensing image including the sensing signal as an area of interest and calculating the average of the index in the area of interest.

18. The non-transitory computer readable medium according to claim 17, wherein the inspection object is a plant, the state indicates growth conditions of the plant, and the index is a index based on reflection of light by the plant.

19. The non-transitory computer readable medium according to claim 17, wherein the operations further comprise:
calculating the average of the index by averaging the index in an entire inspection object;
calculating a correlation coefficient that matches the average of the index with a predetermined specified value; and
applying the correlation coefficient and calculating the relative value of the index relative to the average of the index in each measurement unit in which a measurement is performed on the inspection object.

20. An apparatus comprising:
a memory storing program code, and
at least one processor configured to execute the program code to perform operations comprising:
calculating a relative value to an average of an index from the index indicative of a state of an inspection object, which is calculated on a basis of a sensing signal;
performing processing to allow an image indicative of the state of the inspection object on a basis of the relative value to be displayed; and
specifying a predetermined area of the inspection object projected on a sensing image including the sensing signal as an area of interest and calculating the average of the index in the area of interest.

21. The apparatus according to claim 20, wherein the inspection object is a plant, the state indicates growth conditions of the plant, and the index is a index based on reflection of light by the plant.

22. The apparatus according to claim 20, wherein the operations further comprise:
calculating the average of the index by averaging the index in an entire inspection object;
calculating a correlation coefficient that matches the average of the index with a predetermined specified value; and
applying the correlation coefficient and calculating the relative value of the index relative to the average of the index in each measurement unit in which a measurement is performed on the inspection object.

* * * * *